Patented Jan. 3, 1939

2,142,968

UNITED STATES PATENT OFFICE 2,142,968

STABILIZING ARTICLES CONTAINING POLYMERIZED STYRENE

Sylvia M. Stoesser, Midland, Mich., assignor to The Dow Chemical Company, Midland, Mich., a corporation of Michigan No Drawing. Application July 22, 1936, Serial No. 92,043

4 Claims. (Cl. 260—2)

This invention relates to resins comprising polymerized styrene, and is particularly concerned with a method for stabilizing against "frosting" the surface of articles made therefrom.

Articles formed from polymerized styrene acquire on standing in the air for relatively short periods of time the appearance of being frosted. The surface is permeated with hairlines and check marks and the article loses the clear, glassy appearance which is one of the desirable characteristics of styrene resins.

I have now found that articles formed from molding material comprising polymerized styrene can be stabilized against frosting by subjecting the surfaces of such articles to the action of a solvent for the polymer and then drying in a substantially anhydrous atmosphere. Articles whereof the surfaces have acquired a frosty appearance can be restored to their original brilliancy and luster by subjecting the surface of the article to the action of solvents for the polymer, and are thereafter stabilized against subsequent frosting. The restoration of the surface appearance of a frosty polymerized styrene article is not of itself unusual, since it is an old art to restore by pickling treatments the surface appearance of articles generally; but a peculiar result inures to the treatment of polymerized styrene articles with a suitable solvent, because of the surprising fact that the surface of the article is permanently stabilized against checking and frosting subsequent to the treatment. This is a most unusual and unexpected result, since it would appear that the only action of the solvent would be to dissolve away that portion of the surface containing the hair-lines which impart the frosted appearance to the exterior of the resin article; and it would be expected that the fresh surface so exposed would be subject to the same checking and frosting as was the original surface of the article.

The treatment of articles formed from polymerized styrene can be carried out at room temperatures in ordinary atmosphere. Under such conditions it is preferable to use a solvent boiling between about 60° and about 125° C. Solvents of lower boiling point evaporate rapidly after the article has been removed from contact therewith, and may cause blushing and re-frosting of the article, which may be due in part to condensation of moisture from the surrounding air. Solvents of higher boiling point than about 125° C. may not evaporate readily enough from the surface and slow up the time for the treatment. Among the solvents I have employed successfully are benzene, carbon tetrachloride, trichloroethylene, and tetrachloroethylene.

It is advantageous to treat the articles within a relatively short period after they have been formed and before the surfaces thereof have had time to become much frosted. For example, cups, parts employed in electrical apparatus, and similar articles formed by injection molding, should preferably be treated the same day they are made. The surfaces of such articles can be adequately stabilized against subsequent frosting by immersing for about 60 seconds in any of the above-named solvents at ordinary room temperature. Preferably the articles are dried subsequent to the solvent treatment in a substantially anhydrous atmosphere, for instance, by placing them in a drying oven maintained at a temperature of about 80° C. The solvent may also be evaporated from the surface of the article by blowing dry air thereover. If the article has already acquired a frosty appearance prior to the treatment, longer treating time will be necessary.

If it is desirable to use solvents boiling below about 60° C., such as carbon disulphide, this can be done by carrying out the treatment in a dry atmosphere, thereby to prevent the condensation of moisture upon the surface of the article when it is removed from the treating bath, due to cooling by the rapid evaporation of the solvent.

Other modes of applying the principle of my invention may be employed instead of those explained, change being made as regards the method herein disclosed or the materials employed, provided the step or steps stated by any of the following claims be employed or the product claimed in any of the following claims be obtained.

I therefore particularly point out and distinctly claim as my invention:

1. In a method of stabilizing a solid polystyrene article against surface frosting and checking, the steps which consist in treating the surface of the article with a solvent for polystyrene and thereafter evaporating the solvent under conditions which will prevent appreciable condensation of moisture on the surface.

2. The method which comprises treating a frosted or checked surface of a solid polystyrene article with a solvent for polystyrene and thereafter evaporating the solvent from the surface under conditions which will prevent appreciable condensation of moisture thereon.

3. The method which comprises stabilizing a polystyrene article against surface frosting and checking by washing the surface of the article with a solvent for the polystyrene and thereafter evaporating the solvent from the surface while maintaining the article in a substantially anhydrous atmosphere.

4. The method which comprises washing a frosted or checked surface of a solid polystyrene article with benzene and thereafter evaporating benzene from the surface while maintaining the article in a substantially anhydrous atmosphere.

SYLVIA M. STOESSER.